Patented Aug. 19, 1930

1,773,318

UNITED STATES PATENT OFFICE

LEOPOLD RAAB, OF VIENNA, AUSTRIA, ASSIGNOR, BY MESNE ASSIGNMENTS, TO AUSTRO DAIMLER-PUCHWERKE AKTIENGESELLSCHAFT, OF WIENER-NEUSTADT, AUSTRIA

CHASSIS FOR MOTOR VEHICLES

Original application filed June 17, 1926, Serial No. 116,758, and in Austria June 24, 1925. Divided and this application filed January 21, 1927. Serial No. 162,658.

The object of the present invention is to provide a chassis for motor vehicles whereby shocks produced by uneven roads will be effectively minimized and whereby a convenient housing for the driving mechanism is obtained, and the invention consists essentially in forming the chassis out of a single tubular body which is arranged in a central position and which slopes towards the rear, one end of the body being connected to the gear box and the engine casing and the other to a divided back axle casing whose parts are adapted to swing about the chassis in a plane at right angles thereto. By the rearward inclination of the chassis body the latter will be disposed at a favorable angle relative to the direction of the shocks caused by the movement of the vehicle over uneven roads. The chassis encloses the driving shaft and is continuous and closed except for a small aperture through which the rear axle gears have access to the shaft. The two parts of the back axle casing are mounted direct on the chassis and are clamped to the same by means of straps so as to form adjustable frictional shock absorbers.

This application is a division of application Serial No. 116,758, filed June 17, 1926.

Fig. 1 of the accompanying drawings represents a diagrammatic view of the chassis, Fig. 2, a section on an enlarged scale of the rear part of the same, and Fig. 3, a section of the chassis and back axle casing at right angles to Fig. 2.

As a substitute for the ordinary frame, the motor vehicle is provided with a chassis in the form of a tubular body 1 arranged in a central position and connected rigidly, at one end to the gear box 2, and the engine casing 3 and at the other end to the back axle casing 6 which is divided, together with the axle 10 into two parts adapted to swing about the chassis. The chassis slopes towards the rear, as shown in Fig. 1, and the back axle parts swing in a plane at right angles to the chassis, so that the chassis itself and the plane of the axle deflection will be at favorable angles relative to the direction of the shocks caused by the movement of the vehicle over uneven roads.

The two parts of the back axle casing are formed with bearing shells 12 whereby they are directly mounted on the chassis body 1 which serves as a journal and obviates the use of a separate hinge pin for the axle parts. The shells are preferably clamped to the chassis body so as to act as frictional shock absorbers. This may be effected by means of straps which can be adjusted to vary the friction according to requirements.

The axle parts 10 are fitted with worm wheels 9 which enter an aperture in the chassis body and mesh with a worm 8 on the driving shaft 7, the latter being supported by means of ball-bearings 18 in a central position inside the chassis body so as to be in the center of the deflecting movement of the axle parts.

The adjacent ends of the back axle casing are enclosed in a casing 13 which is rigidly connected to the chassis body 1. This casing supports the springs 16 which control the deflecting movements of the back axle under the weight of the vehicle. The springs bear against flap-shaped members 15 on the two parts of the axle casing. These flaps are fitted with packing strips 14 which form a tight joint with the casing 13 and act in cooperation with the latter as additional pneumatic shock absorbers. Valves 17 allow the air to escape from between the flaps when the springs are compressed, and prevent a quick readmission of the same so that the return movement will be checked.

I claim:

1. In a motor vehicle, the combination with a rear axle and a casing for the same divided into two, relatively deflectable parts, of a continuous cylindrical chassis of throughout uniform diameter carried through said axle casing without interruption and forming the journal about which the parts of the casing are deflected, the casing being mounted directly on said journal.

2. In a structure as claimed in claim 1, a propeller shaft carried through the chassis, a worm on said shaft, and worm wheels on the axle parts meshing with said worm, the chassis being slotted to admit the worm wheels.

Aug. 19, 1930.      C. F. RAUEN      1,773,319
PROPELLER SPINNER
Filed Feb. 18, 1928
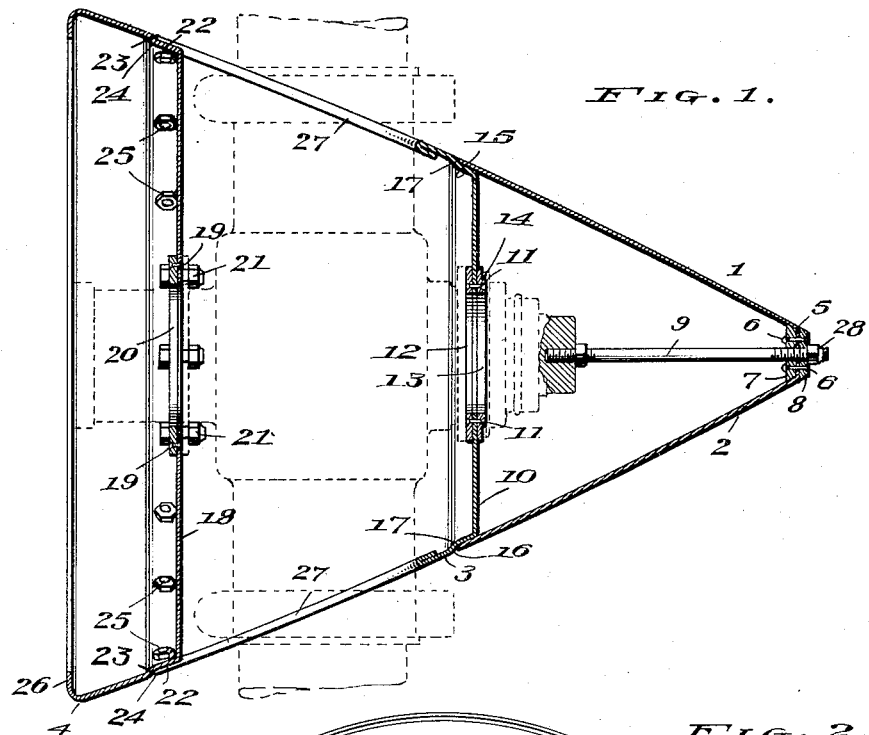
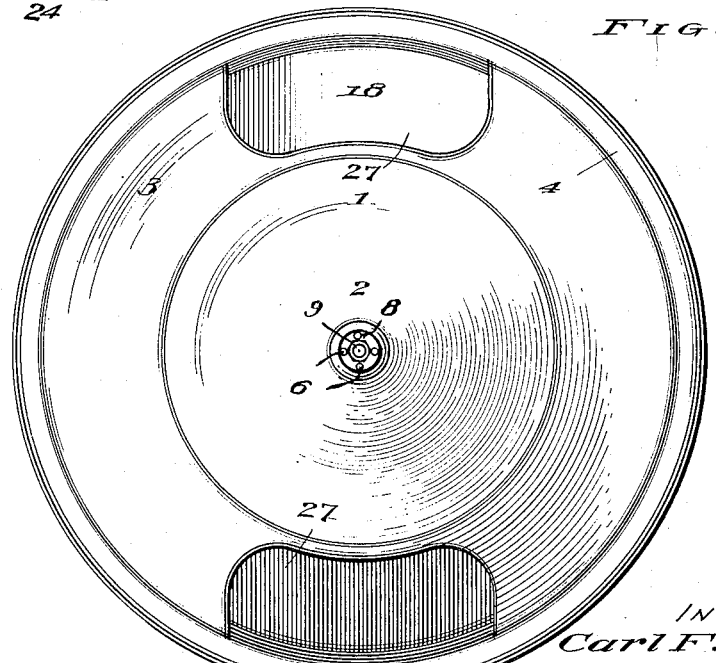
INVENTOR
Carl F. Rauen
BY
ATTORNEY